United States Patent
Yamaguchi et al.

(10) Patent No.: US 11,825,061 B2
(45) Date of Patent: Nov. 21, 2023

(54) IMAGE FORMING APPARATUS, METHOD OF CONTROLLING, AND COMPUTER PROGRAM PRODUCT CORRECTING AN IMAGE FORMING CONDITION BASED ON COLOR OF FORMED IMAGE AND MEDIUM UNDER IMAGE, AND COLOR SPACE REFERENCE DATA

(71) Applicant: KONICA MINOLTA, INC., Tokyo (JP)

(72) Inventors: Toru Yamaguchi, Koganei (JP); Daiki Yamanaka, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/120,856

(22) Filed: Mar. 13, 2023

(65) Prior Publication Data
US 2023/0308595 A1   Sep. 28, 2023

(30) Foreign Application Priority Data

Mar. 24, 2022   (JP) .................................. 2022-048107

(51) Int. Cl.
*H04N 1/60* (2006.01)

(52) U.S. Cl.
CPC .......... *H04N 1/6008* (2013.01); *H04N 1/605* (2013.01); *H04N 1/6097* (2013.01)

(58) Field of Classification Search
None
See application file for complete search history.

(56) References Cited

U.S. PATENT DOCUMENTS

| | | | | |
|---|---|---|---|---|
| 7,035,559 B2 * | 4/2006 | Tanaka | ............... | G03G 15/0126 399/49 |
| 7,599,634 B2 * | 10/2009 | Kuo | ....................... | H04N 1/603 358/1.9 |
| 8,610,952 B2 * | 12/2013 | Fukuda | ................ | H04N 1/6033 358/1.9 |
| 8,988,748 B2 * | 3/2015 | Sevenich | ............. | H04N 1/6097 358/2.1 |
| 11,310,397 B2 * | 4/2022 | Matsuo | ................ | H04N 1/6036 |

FOREIGN PATENT DOCUMENTS

JP            5775294 B2    9/2015

* cited by examiner

*Primary Examiner* — Scott A Rogers
(74) *Attorney, Agent, or Firm* — Squire Patton Boggs (US) LLP

(57) ABSTRACT

An image forming apparatus includes: an image forming mechanism that forms a first image on a recording medium based on an image forming condition; a detector that detects a first color of the first image and a color of a foundation under the first image from the recording medium on which the first image is formed; a storage that stores reference data for specifying a relative relationship between a position of the first color in a color space and a position of the color of the foundation in the color space; and a processing circuitry, wherein the processing circuitry corrects the image forming condition based on the reference data and the first color and the color of the foundation detected by the detector.

18 Claims, 13 Drawing Sheets

FIG. 10
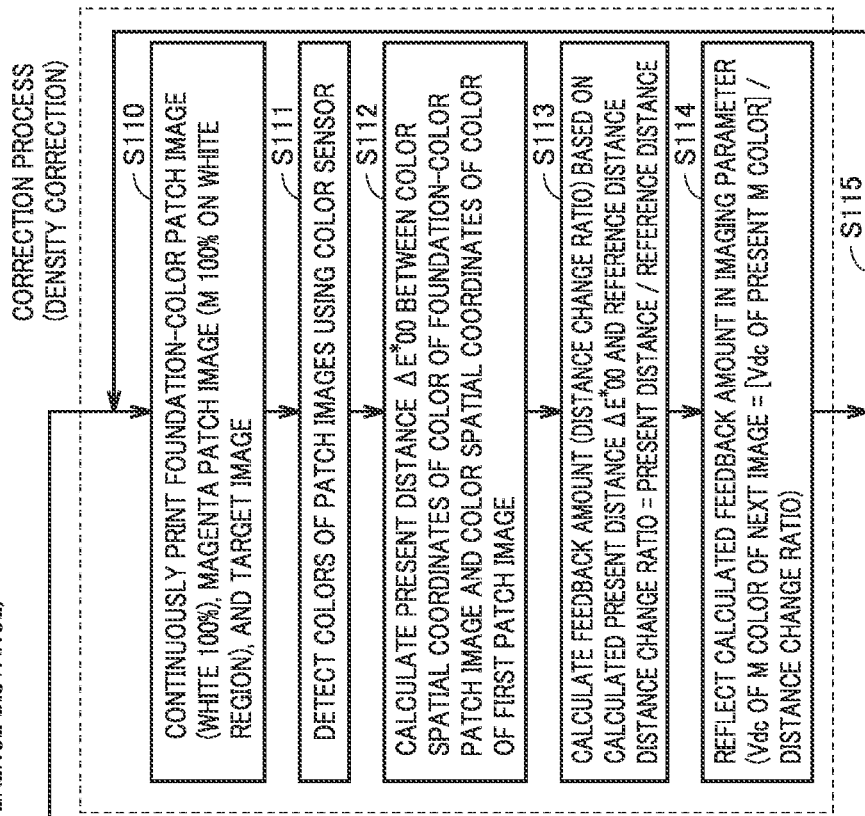
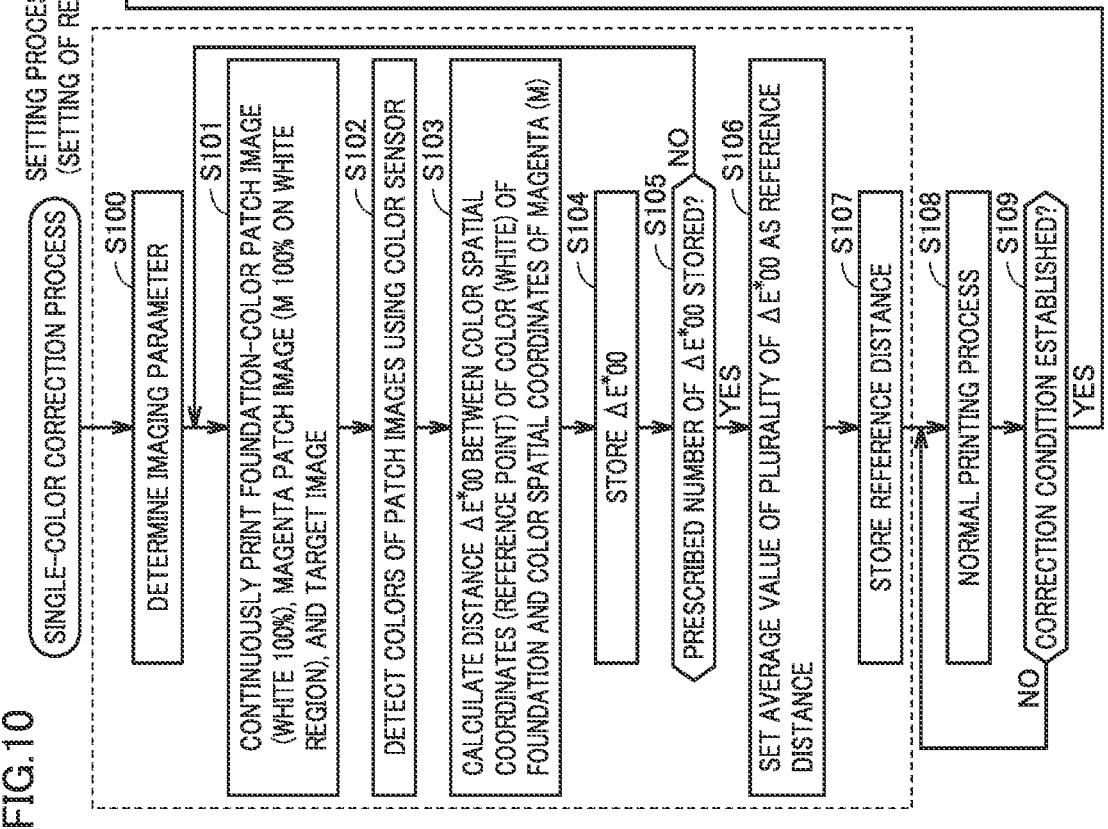

FIG.12

| RELATIVE ANGLE CHANGE AMOUNT | LESS THAN -10% | -10% TO LESS THAN -3% | -3% TO LESS THAN 3% | 3% TO LESS THAN 10% | 10% OR MORE |
|---|---|---|---|---|---|
| PRIMARY TRANSFER OUTPUT | 105% | 102% | 100% | 98% | 95% |

IMAGE FORMING APPARATUS, METHOD OF CONTROLLING, AND COMPUTER PROGRAM PRODUCT CORRECTING AN IMAGE FORMING CONDITION BASED ON COLOR OF FORMED IMAGE AND MEDIUM UNDER IMAGE, AND COLOR SPACE REFERENCE DATA

The entire disclosure of Japanese Patent Application No. 2022-048107, filed on Mar. 24, 2022, is incorporated herein by reference in its entirety.

BACKGROUND

Technological Field

The present disclosure relates to an image forming apparatus, a method of controlling the image forming apparatus, and a non-transitory recording medium storing a computer readable program, and more particularly, to correction of an image forming condition.

Description of the Related Art

In an image forming apparatus, a color density of a patch image or the like as a test chart formed on a recording medium is detected by a sensor, and an image forming condition in an image forming process is corrected based on the detected color density.

Japanese Patent No. 5775294 describes a technique for detecting color unevenness caused by a transfer process based on a change in a hue component of a colorimetric value. The image forming apparatus described in Japanese Patent No. 5775294 detects that color unevenness has occurred in a patch image by comparing a reference value with a statistical value based on an n-th order central moment in a specific color component of a colorimetric value of the patch image acquired by colorimetry means, and adjusts an image forming condition about a specific process so as to reduce the color unevenness.

SUMMARY

With the method described in Japanese Patent No. 5775294, a hue angle and the like required for correction are calculated based on the origin of a color spatial coordinate system such as a Lab color space. The calculation based on the origin of the color spatial coordinate system is established on the assumption that the color of a recording medium on which an image is to be formed is located near the origin of the spatial coordinate system. When a recording medium having a color distant from the origin of the spatial coordinate system, such as colored paper, is used, according to the method described in Japanese Patent No. 5775294, there is a possibility that a change amount in color is erroneously calculated.

The present disclosure has been made in view of the above problem. An object according to an aspect of the present disclosure is to appropriately correct an image forming condition in consideration of a relationship between a color of an image formed on a recording medium and a color of a foundation under the foregoing color.

To achieve at least one of the abovementioned objects, according to an aspect of the present invention, an image forming apparatus reflecting one aspect of the present invention comprises: an image forming mechanism that forms a first image on a recording medium based on an image forming condition; a detector that detects a first color of the first image and a color of a foundation under the first image from the recording medium on which the first image is formed; and a storage that stores reference data for specifying a relative relationship between a position of the first color in a color space and a position of the color of the foundation in the color space; and a processing circuitry, wherein the processing circuitry corrects the image forming condition based on the reference data and the first color and the color of the foundation detected by the detector.

To achieve at least one of the abovementioned objects, according to an aspect of the present invention, a method of controlling an image forming apparatus reflecting one aspect of the present invention is provided. The method of controlling the image forming apparatus includes: forming a first image on a recording medium based on an image forming condition; detecting a first color of a first image and a color of a foundation under the first image from the recording medium on which the first image is formed; and correcting the image forming condition based on the first color, the color of the foundation, and the reference data.

To achieve at least one of the abovementioned objects, according to an aspect of the present invention, a non-transitory recording medium storing a computer readable program reflecting one aspect of the present invention is provided which comprises a program instruction for causing a computer to perform a method of controlling an image forming apparatus. The image forming apparatus includes a storage that stores reference data for specifying a relative relationship between a position of a first color in a color space and a position of a color of a foundation in the color space. The method of controlling the image forming apparatus includes: forming a first image on a recording medium based on an image forming condition; detecting the first color of the first image and the color of the foundation under the first image from the recording medium on which the first image is formed; and correcting the image forming condition based on the first color, the color of the foundation, and the reference data.

The above and other objects, features, aspects, and advantages of the present invention will be apparent from the following detailed description of the present invention understood in connection with the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 10 is a flowchart for explaining a procedure of a single-color correction process.

FIG. 12 is a table illustrating a relationship between a relative angle change amount and a primary transfer output.

DETAILED DESCRIPTION OF EMBODIMENTS

Figure 1:
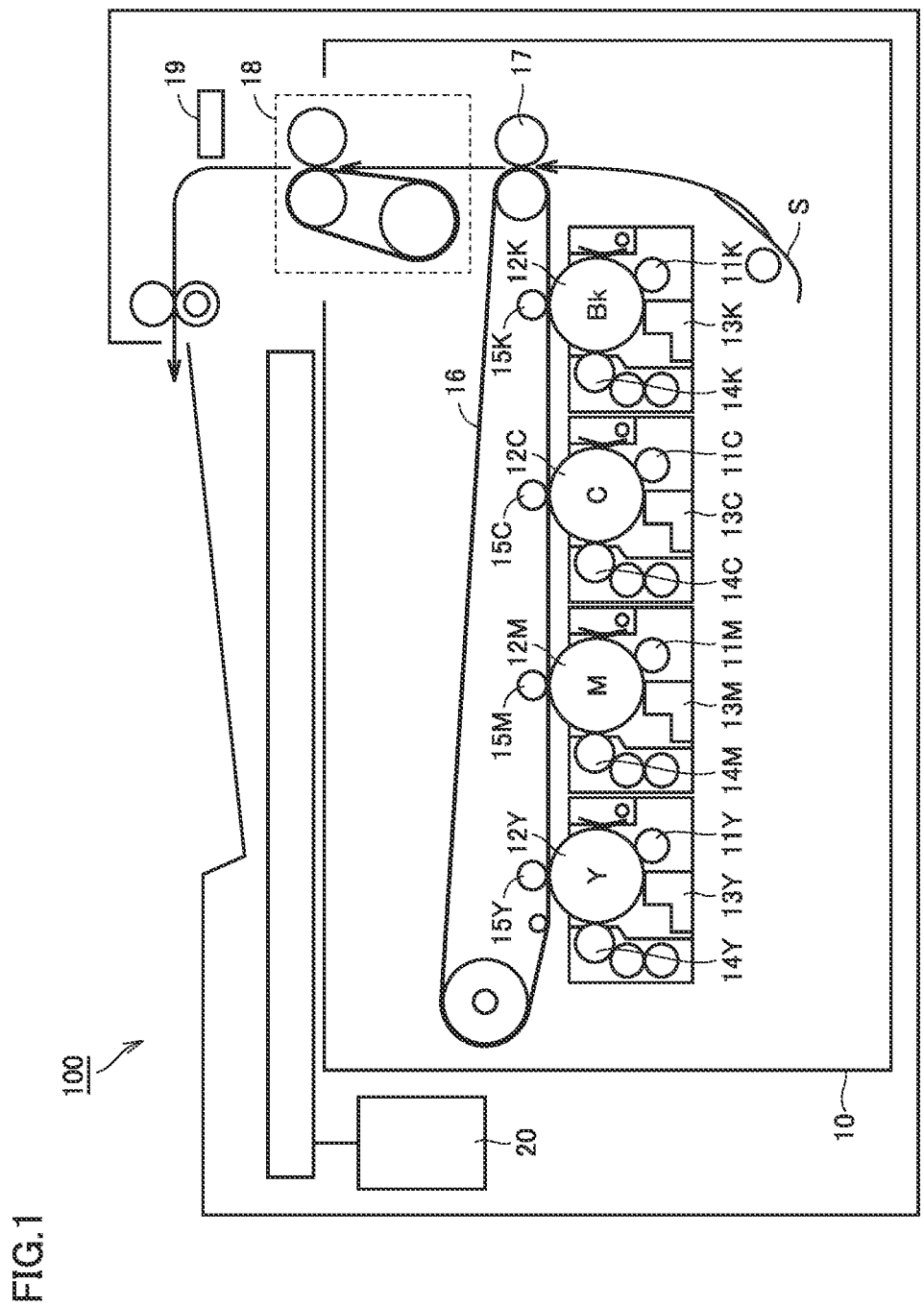
FIG. 1 is a cross-sectional view conceptually showing an example of an overall configuration of an image forming apparatus.

Hereinafter, one or more embodiments of the present invention will be described with reference to the drawings. However, the scope of the invention is not limited to the disclosed embodiments.

Hereinafter, the embodiments will be described in detail with reference to the drawings. Constituent elements, types, combinations, shapes, and relative arrangements of the constituent elements described below are not intended to be limited thereto unless otherwise specified. For example, an image forming apparatus 100 that is a color printer will be described below as an example, but the image forming apparatus 100 of the present disclosure is not limited to a color printer. For example, the image forming apparatus 100 may be a monochrome printer.

Further, the image forming apparatus 100 may be a multi-functional peripheral (M P) including a monochrome printer, a color printer, and a FAX. In the following description, the same or corresponding portions are denoted by the same reference numerals, and the description thereof may not be repeated.

[Overall Configuration of Image Forming Apparatus]

Figure 2:
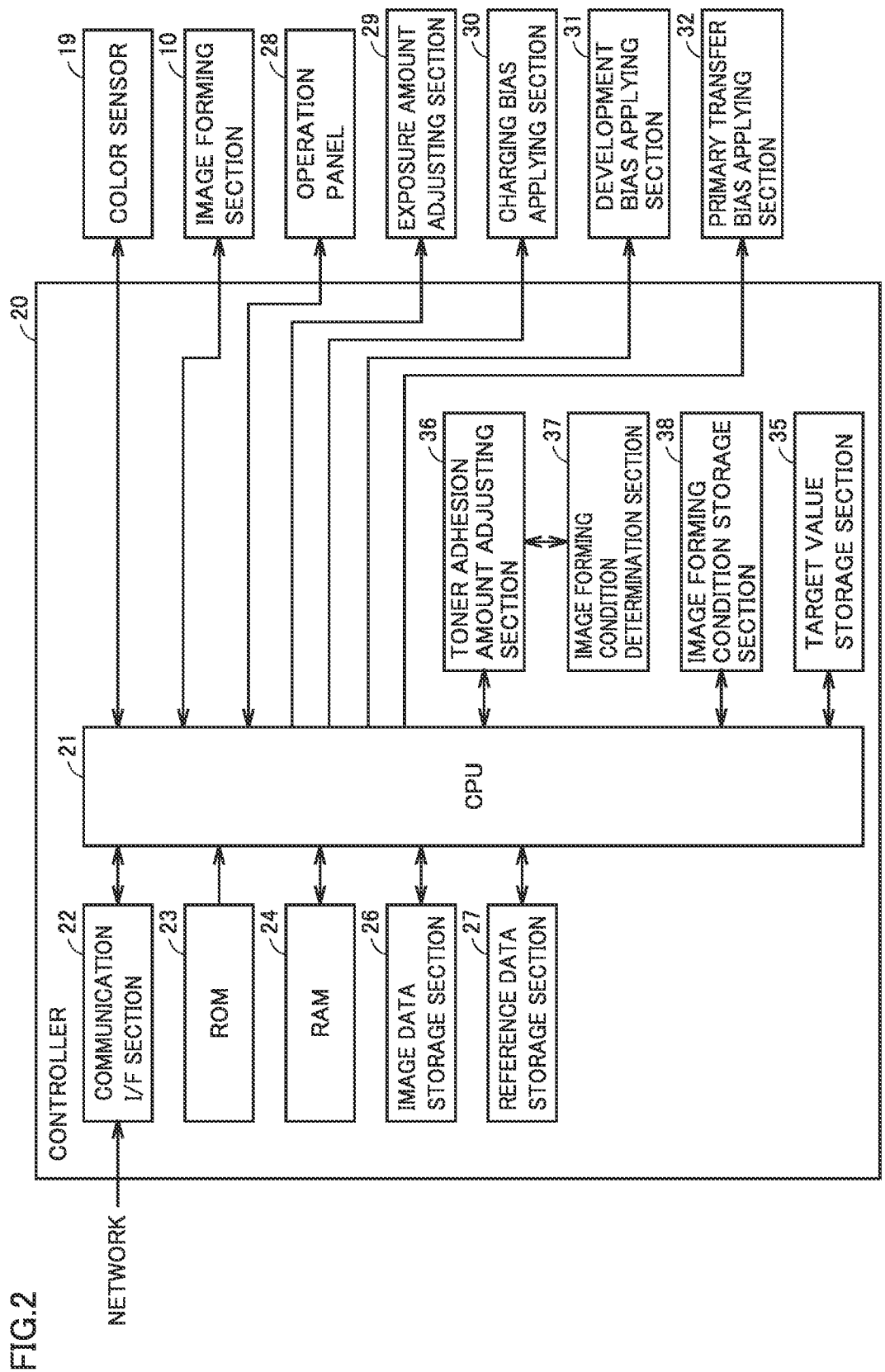
FIG. 2 is a block diagram illustrating a configuration of a controller of the image forming apparatus.

FIG. 1 is a cross-sectional view conceptually illustrating an example of an overall configuration of the image forming apparatus 100. FIG. 2 is a block diagram illustrating a configuration of a controller 20 of the image forming apparatus 100 illustrated in FIG. 1.

With reference to FIGS. 1 and 2, the image forming apparatus 100 includes an image forming section 10, a color sensor 19, a controller 20, an operation panel 28, an exposure amount adjusting section 29, a charging bias applying section 30, a development bias applying section 31, and a primary transfer bias applying section 32. Next, these constituent elements will be described.

The image forming section 10 forms an image using toners of four colors (yellow, magenta, cyan, and black) on a sheet S by using an electrophotographic method. Here, a direction of arrows illustrated in FIG. 1 is a conveyance direction of the sheet S (sub-scanning direction), and a direction perpendicular to the conveyance direction (i.e., a direction perpendicular to the plane of sheet) is a main scanning direction. The sheet S is an example of a recording medium, and is formed of paper, a transparent film, or the like.

As illustrated in FIG. 1, the image forming section 10 includes charging rollers 11Y, 11M, 11C, and 11K, photoreceptors 12Y, 12M, 12C, and 12K, exposure devices 13Y, 13M, 13C, and 13K, developing rollers 14Y, 14M, 14C, and 14K, primary transfer rollers 15Y, 15M, 15C, and 15K, an intermediate transfer belt 16, a secondary transfer roller 17, and a fixing device 18. The image forming section 10 can also be read as an image forming mechanism.

In the image forming section 10, a constituent element whose reference numeral is suffixed with "K" is related to generation of a black toner image. A constituent element whose reference numeral is suffixed with "Y" is related to generation of a yellow toner image. A constituent element whose reference numeral is suffixed with "M" is related to generation of a magenta toner image. A constituent element whose reference numeral is suffixed with "C" is related to generation of a cyan toner image.

Hereinafter, the charging rollers 11Y, 11M, 11C, and 11K are also collectively referred to as a charging roller 11. The photoreceptors 12Y, 12M, 12C, and 12K are also collectively referred to as a photoreceptor 12. The exposure devices 13Y, 13M, 13C, and 13K are also collectively referred to as an exposure device 13. The developing rollers 14Y, 14M, 14C, and 14K are also collectively referred to as a developing roller 14. The primary transfer rollers 15Y, 15M, 15C, and 15K are also collectively referred to as a primary transfer roller 15.

Each of the photoconductors 12 is uniformly charged by a corresponding charging roller 11. Thereafter, a light beam is emitted from the exposure device 13 in accordance with input image data, whereby an electrostatic latent image corresponding to the image data is formed on a surface of each photoreceptor 12. The scanning of the light beam is performed in the main scanning direction.

The developing roller 14 is provided so as to face the photoreceptor 12. The developing roller 14 causes a toner adhering to the surface thereof to adhere to the photoreceptor 12, and develops a toner image corresponding to the electrostatic latent image on the photoreceptor 12. More specifically, electrostatic latent images formed on the photoreceptors 12 are developed by the developing rollers 14 with supply of toners of colors of yellow (Y), magenta (M), cyan (C), and black (K) being received.

The developed toner images are sequentially transferred onto intermediate transfer belt 16 by primary transfer rollers 15. At this time, a primary transfer bias voltage is applied to each of the primary transfer rollers 15. Thus, the toner images on the photoreceptors 12 are transferred to intermediate transfer belt 16. The intermediate transfer belt 16 functions as an image carrier that carries the toner images. A sheet S is conveyed to the secondary transfer roller 17, and the toner images transferred to the intermediate transfer belt 16 are collectively transferred to the sheet S by the secondary transfer roller 17. Thereafter, the toner images are fixed on the sheet S by the fixing device 18.

The color sensor 19 as a detector detects the color of the image fixed on the sheet S. A configuration example of the image forming section 10 in the case of a secondary transfer method of a horizontal tandem type has been described above. However, the configurations and arrangements of the various elements such as the photoreceptors, the charging devices, the exposure devices, the developing devices, the transfer section, and the fixing section are not limited to the case of FIG. 1, and other configurations and arrangements may be employed. For example, the image forming section 10 may be of a direct transfer type.

The operation panel 28 illustrated in FIG. 2 is a user interface for a user to input various setting values. For example, the operation panel 28 includes a plurality of input keys and a touch screen. The touch screen is an electronic component in which a display device such as a liquid crystal panel or an organic electro-luminescence (EL) panel and a position input device such as a touch pad are combined. The controller 20 receives an instruction from a user or a serviceman through an input of an input key or a touch input on the touch screen. Furthermore, the controller 20 displays a message to the user on the touch screen.

The exposure amount adjusting section 29 adjusts a beam light amount of the exposure device 13 in accordance with a command from the controller 20. The charging bias applying section 30 applies a charging bias of a designated voltage value to the charging roller 11 in accordance with a command from the controller 20. The development bias applying section 31 applies a development bias of a designated voltage value to the developing roller 14 in accordance with an instruction from the controller 20. The primary transfer bias applying section 32 applies a primary transfer bias of a designated voltage value to the primary transfer roller 15 in accordance with a command from the controller 20.

[Configuration Example of Controller]

As illustrated in FIG. 2, the controller 20 includes a CPU (Central Processing Unit) 21, a communication interface (I/F) section 22, a ROM (Read Only Memory) 23, and a RAM (Random Access Memory) 24 as basic constituent elements. The controller 20 can also be read as a processing circuitry.

The CPU 21 reads a program stored in the ROM 23 and executes a command included in the program. The ROM 23 stores programs for controlling the operation panel 28, the exposure amount adjusting section 29, the charging bias applying section 30, the development bias applying section 31, the primary transfer bias applying section 32, and the like. Furthermore, the ROM 23 stores programs for executing processes illustrated in various flowcharts described later. The RAM 24 is used as a working memory of the CPU 21 when executing a program. The communication I/F section 22 is an interface for connecting to a local area network (LAN), such as a LAN card or a LAN board.

The controller 20 includes an image data storage section 26, a reference data storage section 27, a target value storage section 35, a toner adhesion amount adjusting section 36, an image forming condition determination section 37, and an image forming condition storage section 38.

Among the above additional constituent elements, each of storage sections 26, 27, 35, 38 is realized by a rewritable non-volatile memory such as a flash memory. The ROM 23 may be configured as a rewritable non-volatile memory for realizing the above-described storage section. The storage section can also be read as a storage (storage device). The other constituent elements 36, 37 may be realized by a microcomputer including a CPU and a memory, may be realized by a field programmable gate array (FPGA), or may be realized by a dedicated circuit such as an application specific integrated circuit (ASIC). When these functions are realized by a microcomputer, they may be realized by executing a program by the above-described CPU 21.

The image data storage section 26 stores patch image data for single-color correction and patch image data for secondary color correction together with their respective image forming conditions. Reference data storage section 27 stores reference data to be a reference at a time of color correction.

The target value storage section 35 stores a target value of a color of an image such as a patch image to be formed on a recording medium. The toner adhesion amount adjusting section 36 adjusts a toner adhesion amount through the image forming condition determination section 37 so as to obtain a target toner adhesion amount corresponding to the target value.

[Principle of Single-Color Correction]

Figure 3:
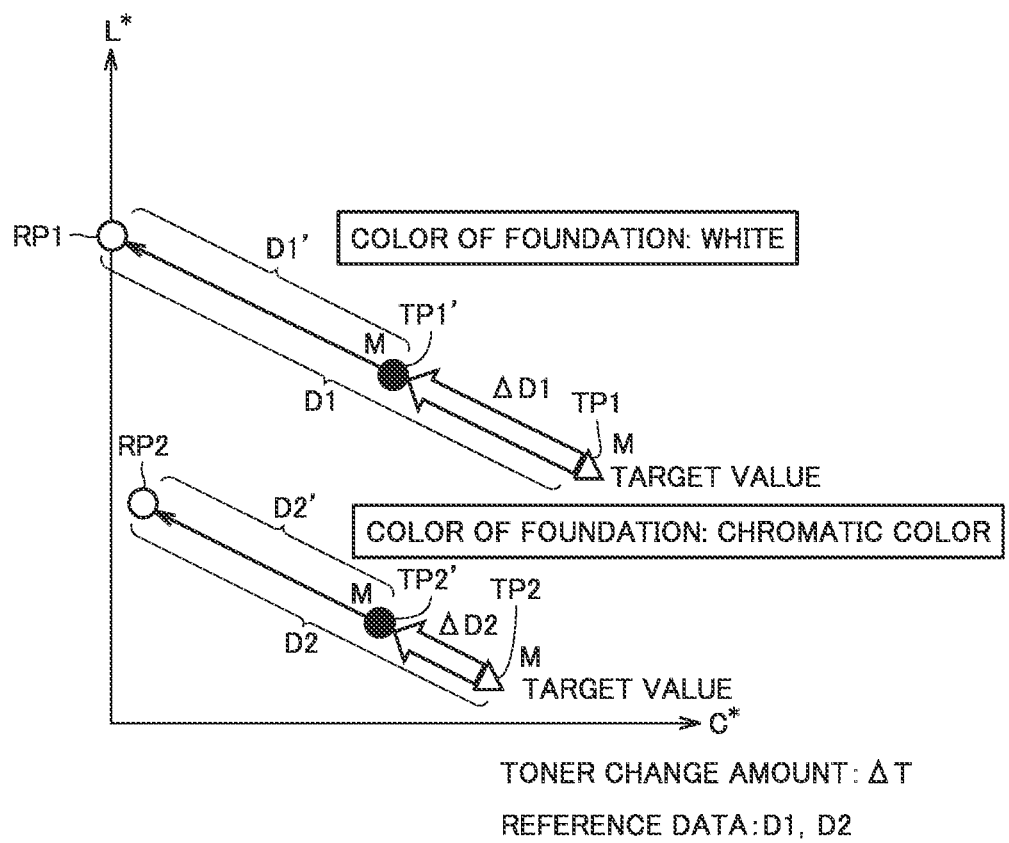
FIG. 3 is a diagram for explaining a principle of single-color correction (developability correction).
Figure 4:
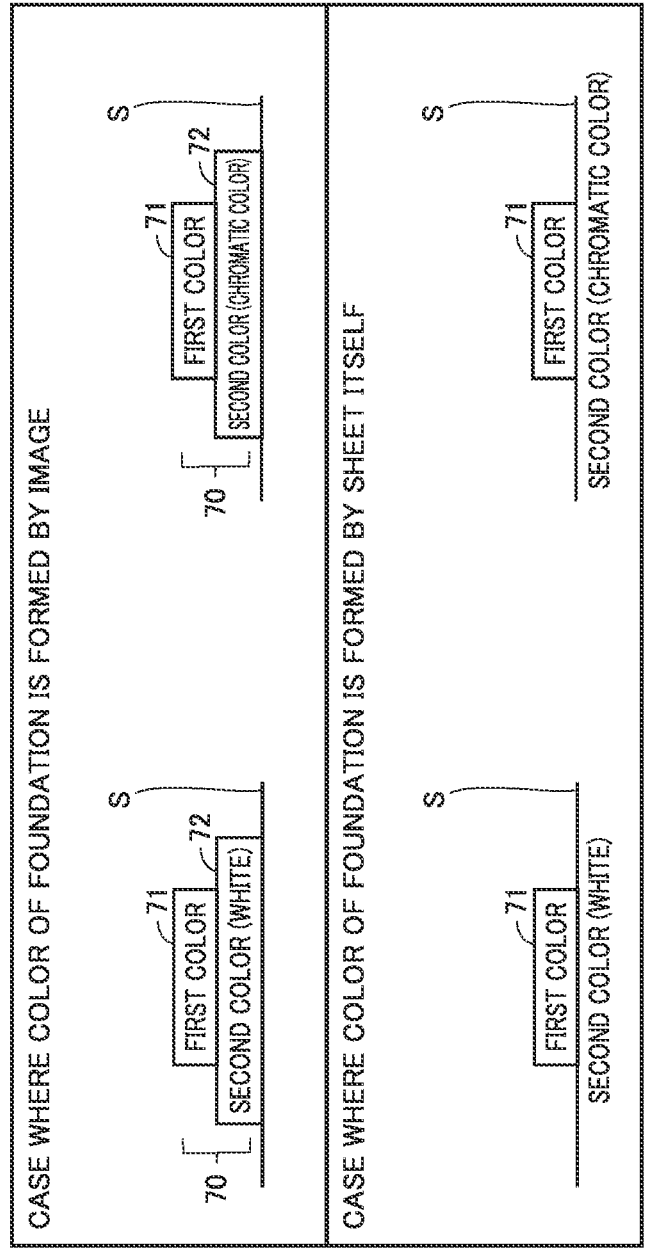
FIG. 4 is a diagram illustrating a case where a color of a foundation under a first image of a first color is formed by a second image and a case where the color of the foundation is formed by a color of a sheet itself.

FIG. 3 is a diagram for explaining a principle of single-color correction (developability correction). FIG. 4 is a diagram showing a case where a color of a foundation under a first image 71 of a first color is formed by a second image 72 and a case where the color of the foundation is formed by a color of a sheet S itself.

In the graph illustrated in FIG. 3, the horizontal axis represents a hue C* and the vertical axis represents a brightness L*. Here, a case where the color of the foundation is white and a case where the color of the foundation is a chromatic color will be compared and described.

The color of the foundation may be, for example, a paper color of the sheet S itself, or may be a color of a foundation image formed as a foundation (so-called underlying layer) on the sheet S when a colorless and transparent sheet S or the like is employed.

In the upper part of FIG. 4, an example in which a second image formed in a second color is arranged as the foundation under the first image 71 formed in the first color (single color) is illustrated. In the lower part of FIG. 4, an example in which a sheet S of the second color is arranged as the foundation under the first image 71 formed in the first color (single color) is illustrated. A multilayer image 70 in which the first image 71 of the first color is superimposed on a part of the second image 72 of the color of the foundation is formed by the first image 71 and the second image 72.

The first color is a color (single color) to be corrected. The first color may be any toner color such as yellow, magenta, cyan, or black. Here, magenta (M) is set as a color to be corrected. Here, white (achromatic color) and chromatic color are exemplified as the second color. When the second color is a chromatic color, the color may be any toner color such as yellow, magenta, cyan, and black, or may be a secondary color generated by combining these toner colors. Note that the second color is different from the first color.

In FIG. 3, RP1 indicates a reference value of the color of the foundation when the color of the foundation is white. TP1 indicates a target value of a color M of an image to be formed on the foundation when the color of the foundation is white. TP1' indicates a present value (variation value) of the color M of the image formed on the foundation when the color of the foundation is white.

In FIG. 3, RP2 indicates a reference value of the color of the foundation when the color of the foundation is a chromatic color. TP2 indicates a target value of the color M of the image to be formed on the foundation when the color of the foundation is a chromatic color. TP2' indicates a present value (variation value) of the color M of the image formed on the foundation when the color of the foundation is a chromatic color.

The reference values RP1, RP2, the target values TP1, TP2 and the present values TP1', TP2' are specified by the coordinates of the graphs. Note that each value can also be specified by numerical values (coordinates) of L*, a*, and b* in a CIE Lab color space.

Regardless of whether the color of the foundation is white or a chromatic color, theoretically, the target values TP1 and TP2 can be achieved by using appropriate toner amounts for white and the chromatic color, respectively. FIG. 3 illustrates degrees to which the color of magenta (M) is affected in the case where the toner amounts are changed by a certain amount ΔT when the target values TP1 and TP2 are achieved using the appropriate toner amounts. The present values TP1' and TP2' indicate the positions of the color of magenta after the toner amounts are changed by the certain amount ΔT when the target values TP1 and TP2 are achieved using the appropriate toner amounts.

As illustrated in FIG. 3, in the case where the toner amount is changed by the certain amount ΔT when the target value TP1 is achieved using the appropriate toner amount, a distance by which the color of magenta is affected is ΔD1. On the other hand, in the case where the toner amount is changed by the certain amount ΔT when the target value TP2 is achieved using the appropriate toner amount, a distance by which the color of magenta is affected is ΔD2.

Here, ΔD1>ΔD2 is established. That is, in the case of a recording medium with a foundation in the color of white and a high reflectivity, a color change amount is larger with respect to certain toner change amount ΔT than that in the case of a recording medium with a foundation in a chromatic color. Accordingly, in the present embodiment, in order to take the color of the foundation into consideration, the position of the origin (reference point) used as a reference for calculation of a correction amount is changed to RP1 or RP2 in accordance with the color of the foundation. In addition, in the present embodiment, the distances D1 and D2 between the origins (reference points) and the target values are used as reference values for the single-color correction, and correction amounts for the single-color correction are calculated in consideration of present distances D1' and D2' corresponding thereto.

That is, in the present embodiment, the present distance D1' (D2') is calculated based on a detection value of the color sensor 19, and the calculation result is compared with reference data, thereby performing the single-color correction for the color on the foundation.

Therefore, according to the present embodiment, a more appropriate correction amount can be calculated in consideration of the color of the foundation in the recording medium.

[Principle of Secondary Color Correction]

Figure 5:
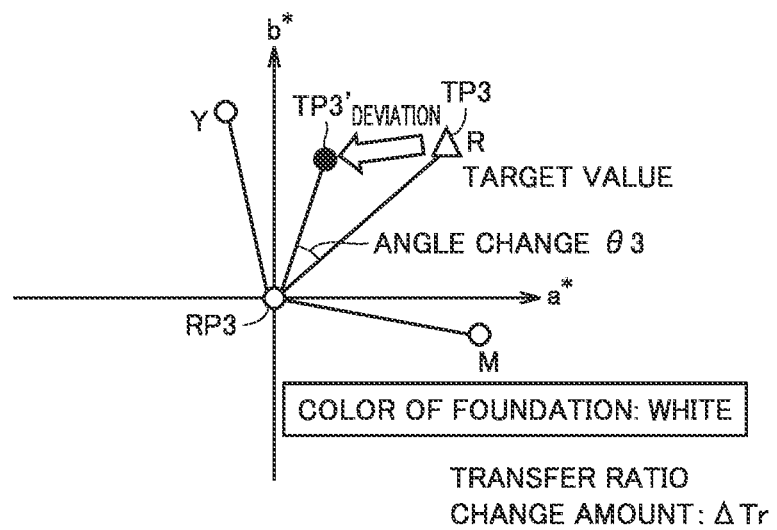
FIG. 5 is a diagram for explaining a principle (color of foundation: white) of secondary color correction (transfer correction).
Figure 6:
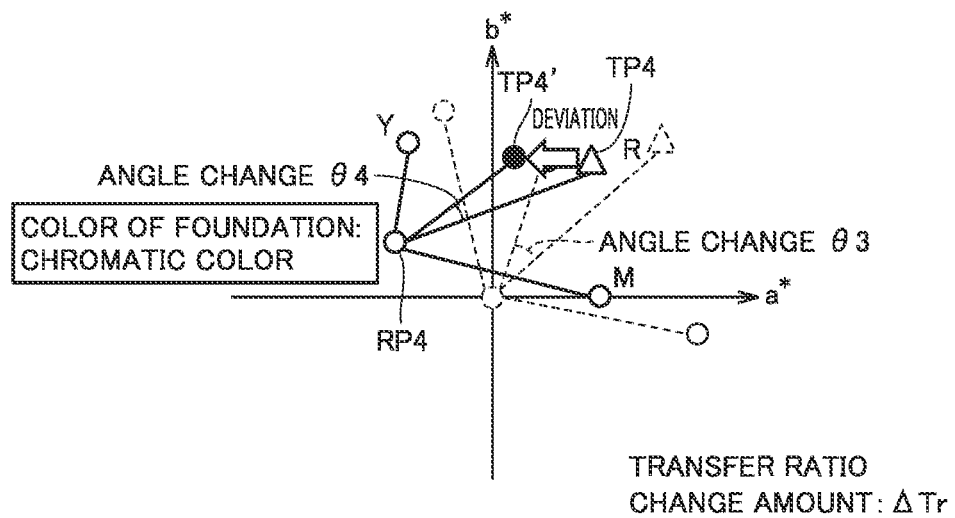
FIG. 6 is a diagram for explaining a principle (color of foundation: chromatic color) of the secondary color correction (transfer correction).

Next, a principle of the secondary color correction (transfer correction) will be described with reference to FIGS. 5 and 6. FIG. 5 illustrates a principle (color of foundation: white) of the secondary color correction (transfer correction) according to the present embodiment. FIG. 6 is a diagram for explaining a principle (color of foundation: chromatic color) of the secondary color correction (transfer correction) according to the present embodiment.

The color of the foundation may be a paper color of the sheet S itself or may be a color of a foundation image formed as a foundation on the sheet S as in the case of the single-color correction. This point is the same as described with reference to FIG. 4.

In the graphs illustrated in FIGS. 5 and 6, the horizontal axis and the vertical axis correspond to a* and b* in the Lab color space, respectively. Here, red (R), which is a secondary color generated by yellow (Y) and magenta (M), is taken as an example of the secondary color to be corrected. In the present disclosure, the secondary color to be corrected may be a color generated by combining two of yellow, magenta, cyan, and black.

In FIG. 5, RP3 indicates a reference value of the color of the foundation when the color of the foundation is white. TP3 indicates a target value of a color R of an image to be formed on the foundation when the color of the foundation is white. TP3' indicates a present value (variation value) of the color R of the image formed on the foundation when the color of the foundation is white. Red (R) is generated by a yellow (Y) toner and a magenta (M) toner.

In FIG. 6, RP4 indicates a reference value of the color of the foundation when the color of the foundation is a chromatic color. TP4 indicates a target value of the color R of the image to be formed on the foundation when the color of the foundation is a chromatic color. TP4' indicates a present value (variation value) of the color, red (R), of the image formed on the foundation when the color of the foundation is a chromatic color. Red (R) is generated by a yellow (Y) toner and a magenta (M) toner.

Regardless of whether the color of the foundation is white or a chromatic color, theoretically, the target values TP3 and TP4 can be achieved by using appropriate transfer ratios, respectively. FIGS. 5 and 6 illustrate degrees to which the color of red is affected in the case where the transfer ratios are changed by a certain amount ΔTr when the target values TP3, TP4 are achieved by employing the appropriate transfer ratios. Therefore, the present values TP3' and TP4' indicate the positions of the red color after the transfer ratios are changed by the certain amount ΔTr when the target values TP3, TP4 are achieved by employing the appropriate transfer ratios.

As illustrated in FIG. 5, in the case where the color of the foundation is white, a deviation of the present value (variation value) TR3' from the target value TR3 is represented by a hue angle θ3 formed by RP3, TP3', and TP3 with the reference point RP3 as a vertex. On the other hand, in the case where the color of the foundation is a chromatic color, as illustrated in FIG. 6, a deviation of the present value (variation value) TR4' from the target value TR4 is represented by a hue angle θ4 formed by RP4, TP4', and TP4 with the reference point RP4 as a vertex. Hereinafter, these hue angles may be referred to as "angle change amounts".

As illustrated in FIGS. 5 and 6, the reference value (RP3, RP4) corresponding to the reference point of the color of the foundation is different between the case where the color of the foundation is white and the case where the color of the foundation is a chromatic color. Further, the angle change amount caused with the position (RP3, RP4) of the reference point as a vertex is different between the case where the color of the foundation is white and the case where the color of the foundation is a chromatic color. Therefore, in the present embodiment, attention is paid to an angle change amount caused with the reference point (RP3, RP4) as a vertex when the secondary color correction is performed.

As described above, the reference point differs depending on the color of the foundation. Reference data employed in the present embodiment when performing the secondary color correction will be described below.

Figure 7:
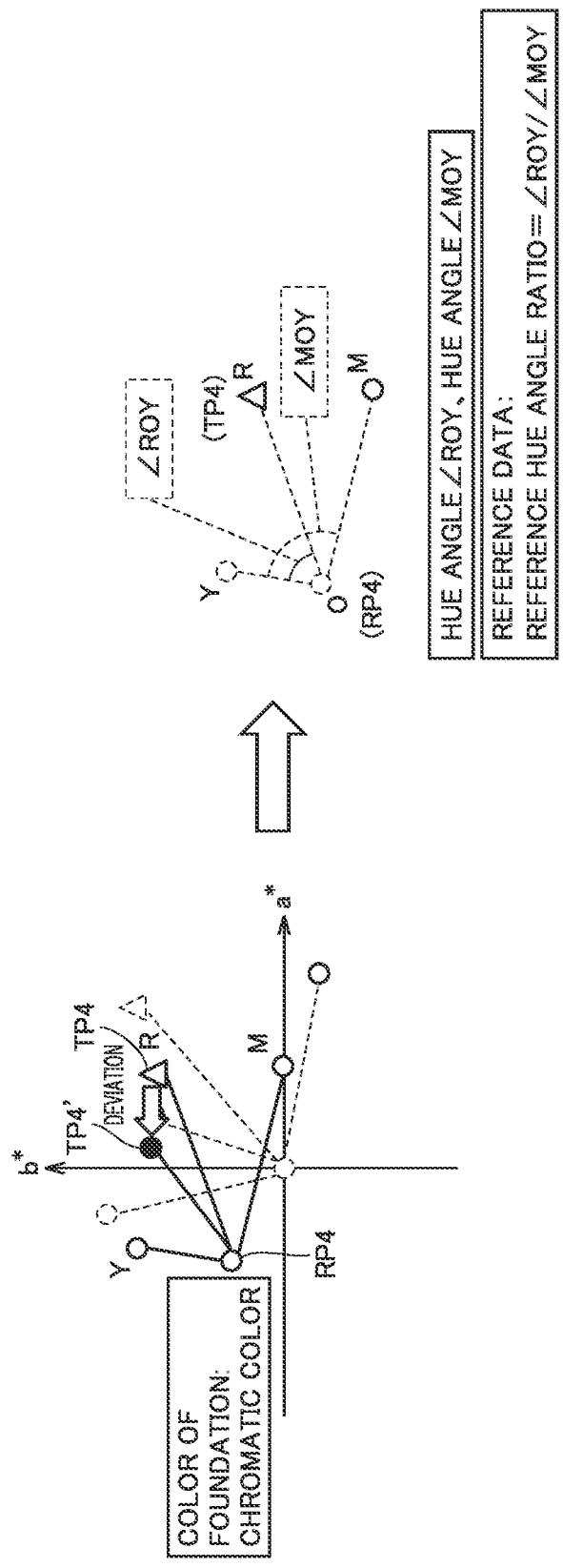
FIG. 7 is a diagram for explaining reference data used for the secondary color correction.

FIG. 7 is a diagram for explaining the reference data used for the secondary color correction. As with FIG. 6, FIG. 7 illustrates the secondary color, red (R), as the secondary color to be corrected. Here, attention is paid to the positions of the reference point O (RP4), Y (yellow), M (magenta), and R (red). These positions can be specified by numerical values (coordinates) of L*, a*, and b* in a Lab color space.

In the figure on the right of the arrow in FIG. 7, the position of R (red) corresponds to the target value TP4. When the reference point O is set to RP4 corresponding to the color of the foundation, the positions of Y (yellow) and M (magenta) correspond to positions of Y (yellow) and M (magenta) for achieving the target value TP4.

When the reference point O, Y (yellow), M (magenta), and R (red) are present at positions illustrated on the right of the arrow in FIG. 7, in the present embodiment, a hue angle ratio between a hue angle ROY and a hue angle MOY formed with the reference point O as a vertex is used as the reference data for the secondary color correction.

That is, in the present embodiment, the secondary color correction is performed by calculating the present hue angle ratio based on the detection value of the color sensor 19 and comparing the calculation result with the reference data. In other words, in the present embodiment, a change in the transfer ratio is calculated based on an angle change of the secondary color. Even if a change amount of the transfer ratio ΔTr is the same, a change amount of the hue angle is different because the tint of the color produced on the foundation is changed depending on the color of the foundation. Therefore, in the present embodiment, the correction amount is calculated from a change ratio when the color of the foundation is set to the 0 point (reference point) and a hue angle difference of each single color constituting the secondary color is set as a reference.

For this reason, according to the present embodiment, it is possible to calculate a more appropriate correction amount in consideration of the color of the foundation in the recording medium not only at the time of the single-color correction but also at the time of the secondary color correction.

Moreover, in the present embodiment, the correction amount is handled as a change in a scalar quantity, such as a distance or angle between a present value and a target value, while taking the color of the foundation into consideration. Therefore, correction control can be simplified. As a result, for example, the correction amount can be also fed back to a process variation amount for which only one dimensional control can be performed. In addition, according to the present embodiment, all the colors synthesized by two toner colors (for example, Y (yellow) and M (magenta)) can be corrected by one factor. Further, according to the present embodiment, it is also possible to correct a color in a maximum color gamut of 100% (solid color), which cannot be corrected by color balance adjustment.

[Patch Image Used for Single-Color Correction]

Figure 8:
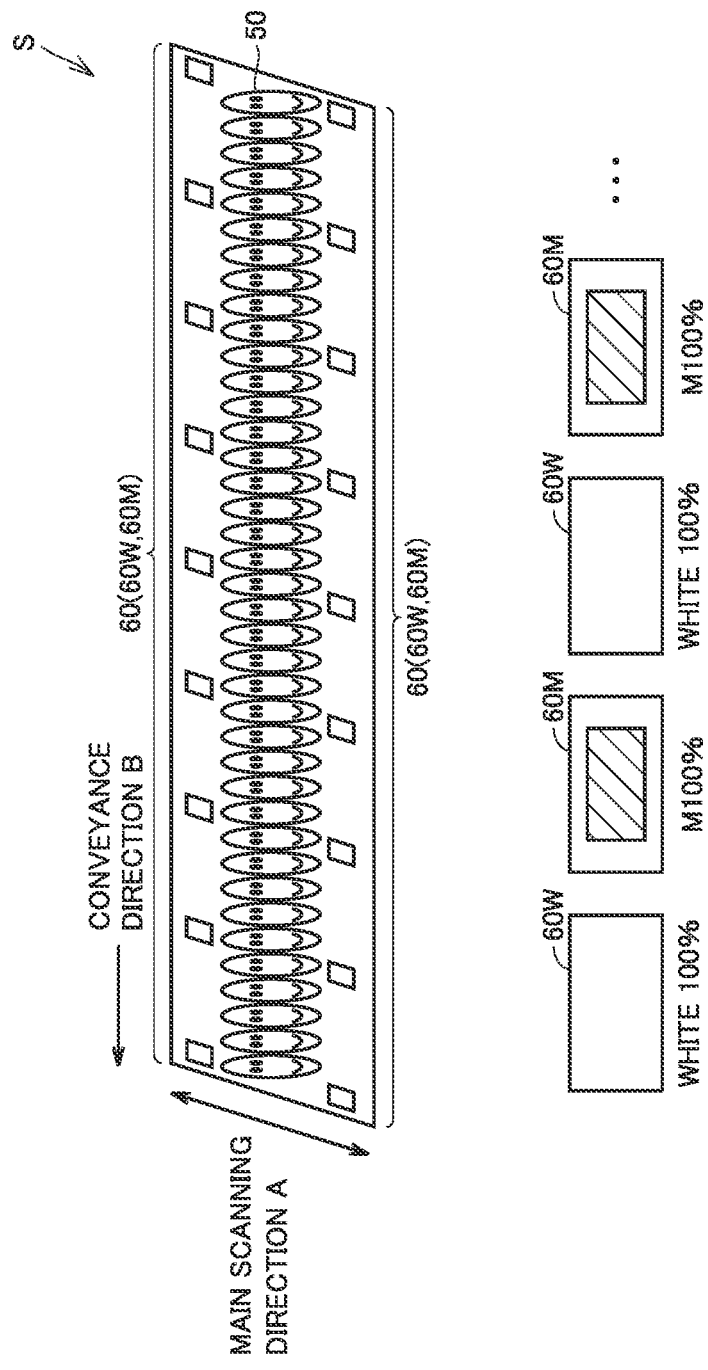
FIG. 8 is a diagram illustrating an example of a patch image (adjustment image) formed on a sheet for the single-color correction.

FIG. 8 is a diagram illustrating an example of a patch image (adjustment image) 60 formed on a sheet S for the single-color correction.

As illustrated in FIG. 8, in the present embodiment, a plurality of patch images 60 are repeatedly formed at both end portions of the sheet S in the main scanning direction A. Target images 50 for printing are repeatedly formed at the center of the sheet S. Each of the patch images 60 is detected by the color sensor 19. The image forming apparatus 100 repeatedly corrects a tint using the patch image 60 detected by color sensor 19 so that the color included in patch image 60 becomes close to the target color. Thus, the tint of each of the target images 50 for printing is also gradually corrected to an appropriate value.

In FIG. 8, the patch image 60 will be described using magenta (M) as an example of the color to be subjected to the single-color correction. In the case where magenta (M) is set as the color to be subject to the correction in this manner, a patch image 60W and a patch image 60M are alternately formed on the sheet S along a conveyance direction B as the patch images 60. Hereinafter, all the types of patch images including the patch image 60W and the patch image 60M are collectively referred to as the patch images 60.

The patch image 60W is a 100%-white image, and is generated by setting a tone of each toner color to 0%, for example. The image forming apparatus 100 may generate a 100%-white patch image 60W using a white-only toner.

The patch image 60M is generated by superimposing a 100%-magenta (tone) image (first image) on a foundation image (second image) having a tint of 100% white. The tint of the foundation under the patch image 60M is the same as that of the patch image 60W. In other words, the color of the patch image 60W is the same as the color of the foundation under the magenta in the patch image 60M.

In this manner, the patch image 60M is constituted of the multilayer image in which the image (first image) of the magenta color (first color) is superimposed on a part of the foundation image (second image). Therefore, the patch image 60M is a specific example of the multilayer image 70 illustrated in the upper part of FIG. 4. Here, white is exemplified as the color of the foundation of the patch image. However, as illustrated in the upper part of FIG. 4, a patch image having a foundation in a chromatic color may be employed.

When the sheet S on which the patch images 60 are formed is conveyed in the conveyance direction B, the color sensor 19 alternately detects the white of the patch image 60W and the magenta on the white serving as the color of the foundation in the patch image 60M.

Note that the color sensor 19 may detect both magenta and the color (white) of the foundation from the magenta patch image created so that a part of the color (white) of the foundation is exposed. For example, by repeatedly moving the detection position of the color sensor 19 in the main scanning direction A, the color sensor 19 can detect both magenta and the color (white) of the foundation from the magenta patch image. Two color sensors 19 including a first sensor disposed at a position for the magenta of the magenta patch image and a second sensor disposed at a position for the color (white) of the foundation in the magenta patch image may detect both the magenta and the color (white) of the foundation from the magenta patch image.

[Patch Image Used for Secondary Color Correction]

Figure 9:
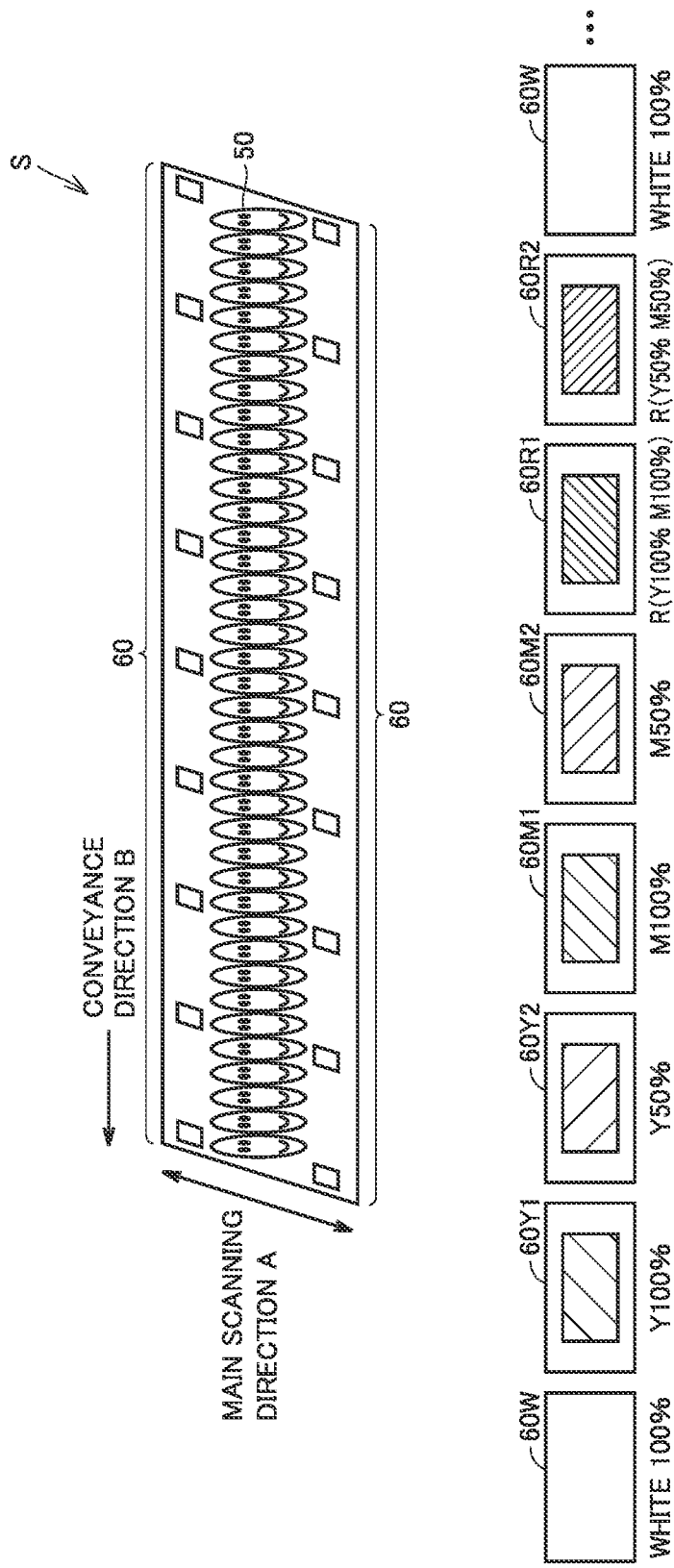
FIG. 9 is a diagram illustrating an example of a patch image (adjustment image) formed on a sheet for the secondary color correction.

FIG. 9 is a diagram illustrating an example of a patch image (adjustment image) 60 formed on the sheet S for the secondary color correction.

Also in the secondary color correction, a plurality of patch images 60 are repeatedly formed at both end portions of the sheet S in the main scanning direction A in the same manner as in the single-color correction. In FIG. 9, each of the patch images 60 will be described using red (R) as an example of the color to be subjected to the secondary color correction. In the case where red (R) is set as the color to be subjected to the correction in this manner, a patch image 60W, a patch image 60Y1, a patch image 60Y2, a patch image 60M1, a patch image 60M2, a patch image 60R1, and a patch image 60R2 are repeatedly formed on the sheet S along the conveyance direction B as the patch images 60.

The patch image 60W is a 100%-white image as in FIG. 8. The other patch images 60Y1, 60Y2, 60M1, 60M2, 60R1, 60R2 are each generated by superimposing an image (first image) of a color of a prescribed tone of yellow, magenta, or red on a foundation image (second image) having a tint of 100% white.

To be specific, the patch image 60Y1 is generated by superimposing a 100%-yellow image on a foundation image having a tint of 100% white. The patch image 60Y2 is generated by superimposing a 50%-yellow image on a foundation image having a tint of 100% white.

The patch image 60M1 is generated by superimposing a 100%-magenta image on a foundation image having a tint of 100% white. The patch image 60M2 is generated by superimposing a 50%-magenta image on a foundation image having a tint of 100% white.

The patch image 60R1 is generated by superimposing a 100%-red image on a foundation image having a tint of 100% white. The patch image 60R2 is generated by superimposing a 50%-red image on a foundation image having a tint of 100% white.

As described above, the patch images 60Y1, 60Y2, 60M1, 60M2, 60R1, 60R2 are constituted of multilayer images in which the respective images (first images) of the colors (first color) of yellow, magenta, and red in various tones are superimposed on parts of the foundation images (second image). Therefore, each of the patch images 60Y1, 60Y2, 60M1, 60M2, 60R1, 60R2 is a specific example of the multilayer image 70 illustrated in the upper part of FIG. 4. Here, white is exemplified as the color of the foundation in the patch image. However, as illustrated in the upper part of FIG. 4, a patch image having a foundation in a chromatic color may be employed.

When the sheet S on which the patch images 60 are formed is conveyed in the conveyance direction B, the color sensor 19 detects the white of the patch image 60W and the chromatic color on the white serving as the foundation in each of the patch images 60Y1, 60Y2, 60M1, 60M2, 60R1, 60R2.

Note that the color sensor 19 may detect the color (white) of the foundation in addition to the chromatic color from any one of the patch images 60Y1, 60Y2, 60M1, 60M2, 60R1, 60R2. As described above, such a detection method can be achieved by repeatedly moving the detection position of the color sensor 19 in the main scanning direction A or by using two color sensors 19.

[Procedure of Single-Color Correction Process]

FIG. 10 is a flowchart for explaining a procedure of the single-color correction process. Here, a procedure of the controller 20 performing the single-color correction process using the patch images 60W, 60M for the single-color correction illustrated in FIG. 8 will be described. That is, here, a single-color correction process method will be described by taking as an example a case where the color of magenta (M) formed on the color, white, of the foundation is maintained at a color density of a target value.

As illustrated in FIG. 10, the single-color correction process includes: a process (step S100 to step S107) of setting a reference distance that is reference data for correction; a normal printing process (step S208) in which the patch images 60 are not printed; and a process (step S110 to step S114) of correcting the density of the target color using the set reference distance.

The process of setting the reference distance will be described. First, the controller 20 determines an imaging parameter (step S100). The imaging parameter is a parameter (printing condition) determined in advance in accordance with the target value of magenta by a correction operation or the like.

Next, as illustrated in FIG. 8, the controller 20 continuously prints the patch image 60W (hereinafter, also referred to as a foundation-color patch image), the patch image 60M (hereinafter, also referred to as a magenta patch image), and the target image 50 on the sheet S (step S101). The step S101 includes a process of producing a first color that is a single color on the patch image 60M by transferring, onto the sheet S, a toner image formed by using a toner (magenta in this case) of any one color of a plurality of basic colors.

Next, the controller 20 detects the colors of the foundation-color patch image and the magenta patch image using the color sensor 19 (step S102). Thus, the color (white) of the foundation-color patch image and the magenta of the magenta patch image are detected.

Next, the controller 20 calculates a distance $\Delta E^*00$ (CIE DE2000) between the coordinates (reference point) of the color (white) of the foundation in the color space and the coordinates of magenta (M) in the color space (step S103). The coordinates are, for example, numerical values of $L^*$, $a^*$, and $b^*$ in the CIE Lab color space. Next, the controller 20 stores the calculated distance $\Delta E^*00$ in the reference data storage section 27 (see FIG. 2) (step S104).

The controller 20 may employ the distance $\Delta E^*00$ stored here, as reference data. In this embodiment, the procedure of calculating the distances $\Delta E^*00$ in this way is repeated a plurality of times, and the average value of the calculated distances $\Delta E^*00$ is used as the reference data. Therefore, the controller 20 determines whether or not the prescribed number of distances $\Delta E^*00$ have been stored in the reference data storage section 27 (step S105). The prescribed number is, for example, three. Note that the prescribed number may be any number equal to or more than two.

When the prescribed number of distances $\Delta E^*00$ are not stored in the reference data storage section 27, the controller 20 returns to the step S101 and repeats the step of calculating the distance $\Delta E^*00$. When the prescribed number of distances $\Delta E^*00$ are stored in the reference data storage section 27, the controller 20 sets the average value of the plurality of distances $\Delta E^*00$ as the reference distance (step S106). The controller 20 stores the set reference distance in the reference data storage section 27 as the reference data to be used for the single-color correction (step S107). Thus, the reference data for specifying the relative relationship between the position of the magenta color (first color) in the color space and the position of the color of the foundation in the color space is stored in the reference data storage section 27. Thus, the process of setting the reference distance is completed.

After completing the process of setting the reference distance, the controller 20 performs the normal printing process (step S108). Thus, for example, the target image 50 illustrated in FIG. 8 is printed on the sheet S. At this time, the patch image 60 is not printed on the sheet S.

Next, the controller 20 determines whether or not the correction condition has been established (step S109). For example, the controller 20 determines that the correction condition has been established when the number of printed sheets in the normal printing process (step S108) reaches a prescribed number (for example, 10 sheets). The controller 20 may determine that the correction condition has been established when a printing time in the normal printing process (step S108) reaches a prescribed time.

The controller 20 repeatedly performs the normal printing process until the correction condition is established. Upon determination that the correction condition has been established, the controller 20 performs the process of correcting the density of the target color using the set reference distance.

Next, the process of correcting the density of the target color using the set reference distance will be described. First, in steps S110 to S112, the controller 20 performs, in a similar flow to that in the steps S101 to S103, the process of printing a patch image or the like, the process of detecting a color, and the process of calculating a present distance $\Delta E^*00$.

Next, the controller 20 calculates a feedback amount (correction amount) to be fed back to the imaging parameter (image forming condition), based on the calculated present distance ΔE*00 and the reference distance stored in the reference data storage section 27 (step S113). Here, for example, the feedback amount is a distance change ratio. The distance change ratio is calculated by dividing the present distance by the reference distance.

Next, the controller 20 reflects the calculated feedback amount in the imaging parameter (step S114). For example, the controller 20 adjusts a development bias value (Vdc) of magenta of a magenta patch image (patch image 60M) to be created next time. More specifically, the controller 20 corrects it to a value obtained by dividing the present development bias value by the distance change ratio. Accordingly, the imaging parameter is corrected to an appropriate value. Therefore, the image forming condition is corrected based on the first color (magenta) and the color of the foundation detected by the color sensor 19, and the reference data.

Next, the controller 20 determines whether or not an ending condition has been established (step S115). For example, when it is determined that the process of the step S114 has been performed a prescribed number of times, the controller 20 determines that the ending condition has been established. The prescribed number of times is one or more. The controller 20 may accept a prescribed number of input operations from the user.

When the ending condition has not been established, the process returns to the step S110 and the processes of the step S110 and subsequent steps are repeated. Thus, the patch images 60W, 60M and the target image 50 are repeatedly printed on the sheet S, and the single-color correction is repeated.

When the controller 20 determines that the ending condition has been established, the controller 20 ends the process that is based on the present flowchart. Note that when the controller determines that the ending condition has been established, the controller may proceed to the normal printing process of the step S108.

By performing the single-color correction process described above, the patch images 60 are periodically created on sheets S, and the color is corrected so that the initially set reference distance is maintained. As a result, the density of the image can be maintained.

In the single-color correction process, the coordinate system of the CIE Lab color space is used as a coordinate system used for specifying a position of a color. However, in addition to the coordinate system of the CIE Lab color space, a position of a color may be specified by using lch and XYZ color coordinate systems or the like. Alternatively, the distance may be simply calculated using ΔEab.

The imaging parameter used for the correction is not limited to the development bias value, and the number of rotations of a developing sleeve, an exposure parameter such as a light amount of the exposure device 13, or an image transfer parameter may be employed. Specific examples of the image transfer parameter include a transfer pressure, a transfer current, and a contact area at the time of transfer in development parameters.

Here, white is exemplified as the color of the foundation. Further, magenta (M) is exemplified as the single color formed on the color of the foundation. However, in the present disclosure, various colors other than white can be employed as the color of the foundation. In the present disclosure, various toner colors such as yellow, cyan, and black can be employed as the single color formed on the color of the foundation.

In the flowchart illustrated in FIG. 10, the reference distance is set in the setting process. However, a designer may store a predetermined reference distance in the reference data storage section 27 in advance. The controller 20 may accept an operation in which the user inputs a reference distance to be stored in the reference data storage section 27. When the reference distance is stored in the reference data storage section 27 in advance, the controller 20 may perform the correction process (steps S110 to S114) based on the reference distance stored in the reference data storage section 27 without performing the setting process (steps S100 to S107).

[Procedure of Secondary Color Correction Process]

Figure 11:
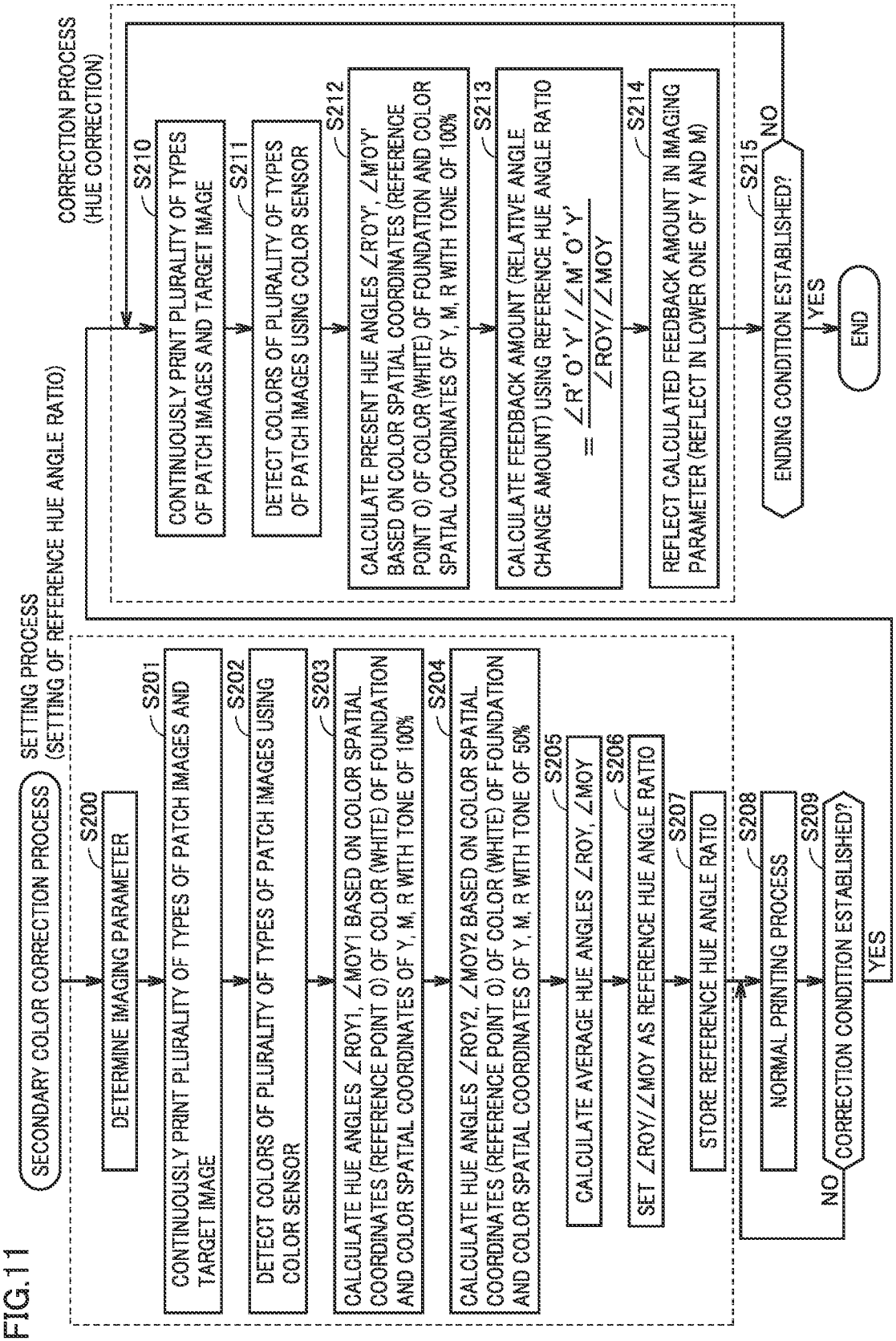
FIG. 11 is a flowchart for explaining a procedure of a secondary color correction process.

FIG. 11 is a flowchart for explaining a procedure of the secondary color correction process. Here, a procedure of the controller 20 performing the secondary color correction process using the patch images 60W, 60Y1, 60Y2, 60 M1, 60M2, 60R1, 60R2 for the secondary color correction illustrated in FIG. 9 will be described. That is, here, a secondary color correction process method will be described by taking as an example a case where the color of red (R) formed on the color, white, of the foundation is maintained at a color density of a target value.

As illustrated in FIG. 11, the secondary color correction process includes: a process (step S200 to step S207) of setting a reference hue angle ratio that is reference data for correction; a normal printing process (step S208) in which the patch images 60 are not printed; and a process (step S210 to step S214) of correcting the density of the target color using the set reference hue angle ratio.

The process of setting the reference hue angle ratio will be described. First, the controller 20 determines an imaging parameter (step S200). The imaging parameter is a printing condition determined in advance in accordance with a target value of red by a correction operation or the like.

Next, as illustrated in FIG. 9, the controller 20 continuously prints the patch image 60W (foundation-color patch image), the patch images 60Y1, 60Y2, 60M1, 60M2, 60R1, 60R2, and the target images 50 on the sheet S (step S201). The step S201 includes a process of producing a first color (here, red) that is a secondary color in each of the patch images 60R1, 60R2 by transferring, onto a recording medium, a toner image formed by superimposing a toner of a first basic color (here, yellow) and a toner of a second basic color (here, magenta).

Next, the controller 20 detects the colors of the patch images 60W, 60Y1, 60Y2, 60 M1, 60M2, 60R1, 60R2 using the color sensor 19 (step S202). Thus, the color (white) of the foundation-color patch image, yellow 100%, yellow 50%, magenta 100%, magenta 50%, red 100%, and red 50% are detected.

Next, the controller 20 calculates a hue angle for each tone (steps S203 and S204).

First, the controller 20 calculates a hue angle ROY1 and a hue angle MOY1 based on the coordinates (reference point) of the color (white) of the foundation in the color space and the coordinates of each of yellow (Y), magenta (M), and red (R) each having a tone of 100% in the color space (step S203). The idea of the hue angle is as described with reference to FIG. 7.

Next, the controller 20 calculates a hue angle ROY2 and a hue angle MOY2 based on the coordinates (reference point) of the color (white) of the foundation in the color space and the coordinates of each of yellow (Y), magenta (M), and red (R) each having a tone of 50% in the color space (step S204).

Next, the controller 20 calculates average hue angles ROY and MOY (step S205). The average hue angle ROY is an average value of the hue angle ROY1 and the hue angle ROY2. The average hue angle MOY is an average value of the hue angle MOY1 and the hue angle MOY2.

Next, the controller 20 calculates a ratio of the average hue angle ROY and the average hue angle MOY1, and sets the calculation result as a reference hue angle ratio (step S206). The reference hue angle ratio is calculated by dividing the average hue angle ROY by the average hue angle MOY1.

Next, the controller 20 stores the set hue angle ratio in the reference data storage section 27 (see FIG. 2) as a reference value used for the secondary color correction (step S207). Thus, the reference data for specifying the relative relationship between the position of the secondary color (first color) in the color space and the position of the color of the foundation in the color space is stored in the reference data storage section 27. Thus, the process of setting the reference hue angle ratio is completed.

In this way, the controller 20 calculates the reference hue angle ratio in consideration of the colors of the plurality of tones. As a result, according to the present embodiment, it is possible to apply the secondary color correction to the colors of the plurality of tones. Note that the present disclosure does not exclude an aspect in which the reference hue angle ratio is calculated based on the hue angle calculated in any one of the step S203 and the step S204. Therefore, the controller 20 may calculate the reference hue angle ratio based on any one of the colors of the plurality of tones. Furthermore, the controller 20 may store, in the reference data storage section 27, the reference hue angle ratio calculated for each tone. In that case, the controller 20 may use different reference hue angle ratios for different tones to correct a color.

Furthermore, the controller 20 may repeatedly detect colors of a plurality of types of patch images using the color sensor 19 (step S202) and repeatedly calculate average hue angles (step S205). In such a case, the controller may calculate an average value of the reference hue angle ratios using the repeatedly calculated average hue angles, and store the calculation result in the reference data storage section 27 as the reference data to be used for the secondary color correction.

After the process of setting the reference hue angle ratio ends, the controller 20 performs the normal printing process (step S208). Thus, for example, the target images 50 illustrated in FIG. 9 are printed on the sheet S. At this time, the patch images 60 are not printed on the sheet S.

Next, the controller 20 determines whether or not the correction condition has been established (step S209). For example, the controller 20 determines that the correction condition has been established when the number of printed sheets in the normal printing process (step S208) reaches a prescribed number (for example, 10 sheets). The controller 20 may determine that the correction condition has been established when a printing time in the normal printing process (step S208) reaches a prescribed time.

The controller 20 repeatedly performs the normal printing process until the correction condition is established. Upon determination that the correction condition has been established, the controller 20 performs the process of correcting the density of the target color using the set reference hue angle ratio.

Next, the process of correcting the density of the target color using the set reference hue angle ratio will be described. First, in steps S210 to S212, the controller 20 performs, in a similar manner to that in the steps S201 to S203, the process of printing a patch image or the like, the process of detecting a color, and the process of calculating a hue angle. Here, the present hue angles calculated in the step S212 are referred to as a hue angle R'O'Y' and a hue angle M'O'Y'.

Next, the controller 20 calculates a feedback amount to be reflected in the imaging parameter, using the reference hue angle ratio (step S213). The feedback amount is a relative angle change amount. The relative angle change amount is calculated by dividing, by the reference hue angle ratio, the hue angle ratio determined by the present hue angle R'O'Y' and the hue angle M'O'Y'.

Next, the controller 20 reflects the calculated feedback amount in the imaging parameter (image forming condition) (step S214). Therefore, the image forming condition is corrected based on the reference data and the first color (secondary color) and the color of the foundation detected by the color sensor 19.

A specific example in which the feedback amount is reflected in the imaging parameter will be described with reference to FIG. 12. FIG. 12 is a table illustrating a relationship between a relative angle change amount and a primary transfer output. Data of the table illustrated in FIG. 12 is stored in advance in, for example, the image forming condition storage section 38. The controller 20 makes reference to the table illustrated in FIG. 12 and reflects, in the imaging parameter, the primary transfer output corresponding to the relative angle change amount. That is, the controller 20 controls the primary transfer bias value so that the relative angle change amount becomes 0, thereby maintaining, at the target value, the hue of the color to be corrected.

At this time, the controller 20 reflects the feedback amount in the imaging parameter for one of yellow (Y) and magenta (M) that constitute red (R), the one of yellow (Y) and magenta (M) being formed on the lower layer side on the sheet S (step S214). In other words, the controller 20 reflects the feedback amount in the imaging parameter for one of the yellow (Y) toner color and the magenta (M) toner color, the one of the yellow (Y) toner color and the magenta (M) toner color being subsequent to the other in the order of being transferred onto the intermediate transfer belt 16. Thus, color adjustment can be facilitated. This is because it becomes possible to adjust a toner amount for producing an appropriate red in consideration of a toner amount previously transferred to the intermediate transfer belt 16.

Subsequently, the flowchart of FIG. 11 will be described. Subsequent to the process of the step S214, the controller 20 determines whether or not an ending condition has been established (step S215). For example, when it is determined that the process of step S214 has been performed a prescribed number of times, the controller 20 determines that the ending condition has been established. The prescribed number of times is one or more. The controller 20 may accept a prescribed number of input operations from the user.

When the ending condition has not been established, the process returns to the step S210 and the processes of the step S210 and subsequent steps are repeated. Thus, the various patch images 60 and target images 50 are repeatedly printed on the sheet S, and the secondary color correction is repeated.

When the controller 20 determines that the ending condition has been established, the controller 20 ends the process that is based on the present flowchart. Note that when the controller determines that the ending condition has been established, the controller may proceed to the normal printing process of the step S208.

By performing the secondary color correction process described above, the patch images 60 are periodically formed on the sheet S, and the hue of the target color is corrected so that the initially set reference hue angle ratio is maintained. As a result, the hue of the target color can be maintained.

Here, white has been exemplified as the color of the foundation. Furthermore, red (R) has been exemplified as the secondary color formed on the color of the foundation. However, in the present disclosure, various colors other than white can be employed as the color of the foundation. In addition, in the present disclosure, it is possible to employ, as the secondary color formed on the color of the foundation, a color generated by a combination of toner colors of various colors such as yellow, cyan, and black.

In the secondary color correction process illustrated in FIG. 11, the reference hue angle ratio has been set in the setting process. However, a designer may store a predetermined reference hue angle ratio in the reference data storage section 27 in advance. The controller 20 may accept an operation in which the user inputs a reference hue angle ratio to be stored in the reference data storage section 27. When the reference hue angle ratio is stored in the reference data storage section 27 in advance, the controller 20 may perform the correction process (steps S210 to S214) based on the reference hue angle ratio stored in the reference data storage section 27 without performing the setting process (steps S200 to S207).

In the secondary color correction process illustrated in FIG. 11, the reference hue angle ratio is calculated in consideration of the colors of the plurality of tones of 100% and 50%. As a result, according to the present embodiment, it is possible to perform correction onto not only an image in a solid color but also an image in halftone.

In the secondary color correction process illustrated in FIG. 11, the coordinate system of the CIE Lab color space is used as a coordinate system used when specifying a position of a color. However, in addition to the coordinate system of the CIE Lab color space, lch and xyz coordinate systems or the like may be used to specify a position of a color.

In the single-color correction process illustrated in FIG. 10 and the secondary color correction process illustrated in FIG. 11, the reference data used for the correction can be handled as a simple scalar quantity. Therefore, a time required for calculating the correction amount can be shortened. As a result, it is possible to quickly feedback the correction amount to the imaging parameter. Furthermore, by performing the feedback to the imaging parameter (process parameter) during continuous printing, variation in the color to be corrected can be suppressed to a certain level or lower.

Modification Example

Figure 13:
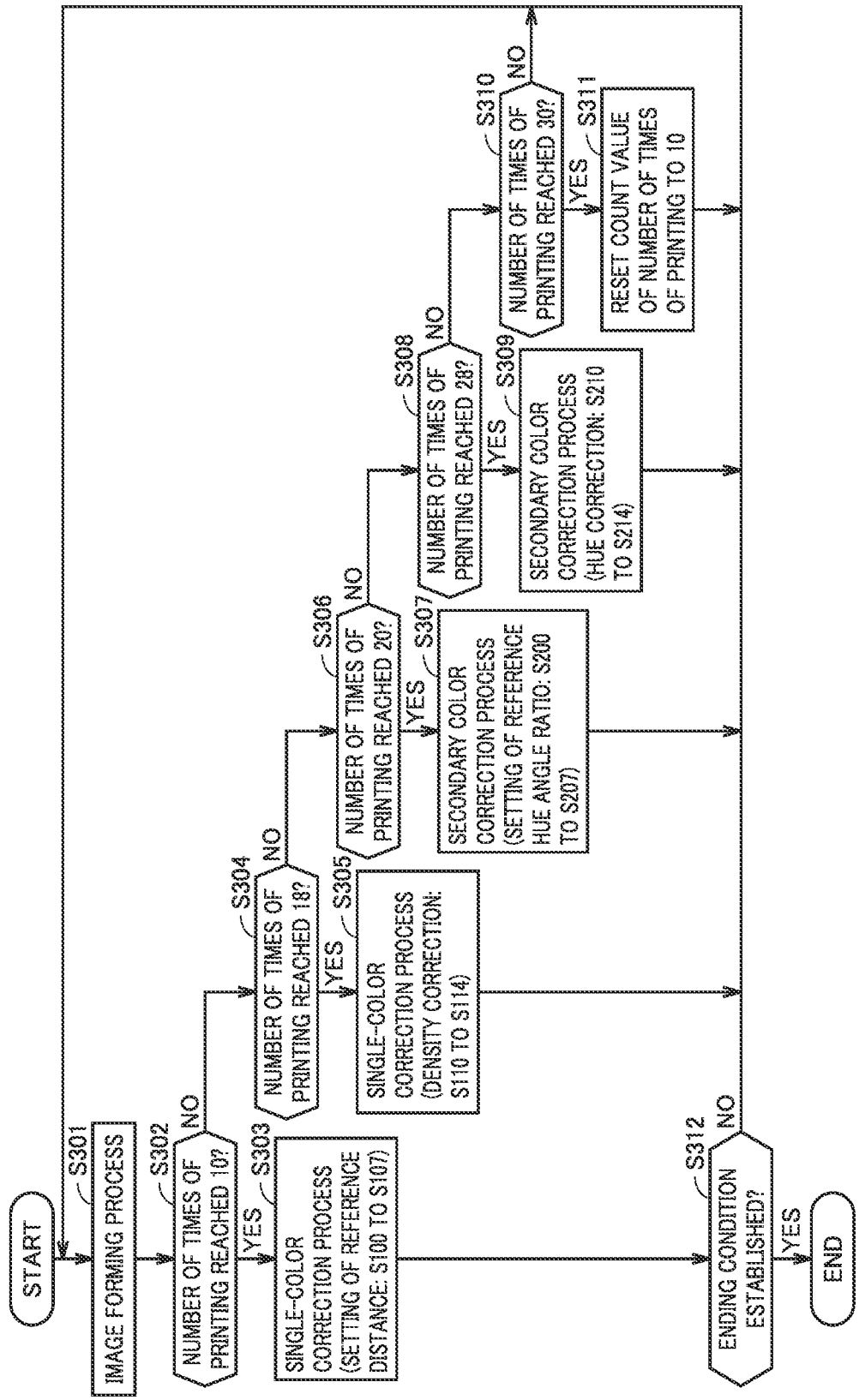
FIG. 13 is a flowchart for explaining a procedure of alternately performing the single-color correction process and the secondary color correction process.

Next, a modification example will be described. FIG. 13 is a flowchart for explaining a procedure of alternately performing the single-color correction process and the secondary color correction process. The controller may alternately perform the single-color correction process illustrated in FIG. 10 and the secondary color correction process illustrated in FIG. 11. FIG. 13 illustrates a process procedure of such a modification example.

First, the controller 20 performs an image forming process (step S301). Thus, a prescribed image is printed on the sheet S. This process is a normal printing process corresponding to, for example, the step S108 in FIG. 10 or the step S208 in FIG. 11.

Next, the controller 20 determines whether or not the number of times of printing has reached 10 (step S302). When the number of times of printing has reached 10, the controller 20 performs the steps S100 to S107 of the single-color correction process (see FIG. 10) (step S303). Thus, a reference distance is set.

Next, the controller 20 determines whether or not an ending condition has been established (step S312). For example, the controller 20 determines that the ending condition has been established when a user's operation to stop the printing operation is detected. When the ending condition has been established, the controller 20 ends the process that is based on the present flowchart. When the ending condition has not been satisfied, the controller 20 returns the process to the step S301.

When the controller 20 determines that the number of times of printing has not reached 10, the controller 20 determines whether or not the number of times of printing has reached 18 (step S304). When the number of times of printing has reached 18, the controller 20 performs the steps S110 to S114 of the single-color correction process (see FIG. 10) (step S305). Thus, the density of the target color is corrected based on the reference distance set in step S303. Thereafter, the controller 20 returns the process to the step S301.

When the controller 20 determines that the number of times of printing has not reached 18, the controller 20 determines whether or not the number of times of printing has reached 20 (step S306). When the number of times of printing has reached 20, the controller 20 performs the steps S200 to S207 (step S307) of the secondary color correction process (see FIG. 11). Thus, a reference hue angle ratio is set. Thereafter, the controller 20 returns the process to the step S301.

When the controller 20 determines that the number of times of printing has not reached 20, the controller 20 determines whether or not the number of times of printing has reached 28 (step S308). When the number of times of printing has reached 28, the controller 20 performs the steps S210 to S214 of the secondary color correction process (see FIG. 11) (step S309). Thus, the hue of the target color is corrected based on the reference hue angle ratio set in the step S307. Thereafter, the controller 20 returns the process to the step S301.

When the controller 20 determines that the number of times of printing has not reached 28, the controller 20 determines whether or not the number of times of printing has reached 30 (step S310). When the number of times of printing has not reached 30, the controller 20 returns the process to the step S301. When the number of times of printing has reached 30, the controller 20 resets the count value of the number of times of printing to 10 (step S311), and returns the process to the step S301.

According to the process procedure described above, the single-color correction process and the secondary color correction process are alternately performed. Accordingly, it is possible to enhance efficiency of the correction process. Moreover, since the single-color correction process and the secondary color correction process are alternately performed, it is possible to prevent the correction processes from interfering with each other and adversely affecting the color correction. Note that here, the threshold value for the number of times of printing is set as illustrated in FIG. 13, but this is merely an example. For example, the controller 20 may accept an operation in which the user inputs the threshold value illustrated in FIG. 13 for the number of times of printing.

The image forming apparatus 100 according to the present embodiment can perform the single-color correction process and the secondary color correction process. However, the present disclosure is also applicable to an image forming apparatus that performs one of the single-color correction process and the secondary color correction process and does not perform the other.

[Program]

A program for causing the controller 20 to perform the above-described process is stored in the ROM 23 of the controller 20. Such a program includes at least a program that complies with the flowcharts described above. The program may be recorded in a non-transitory computer-readable medium such as a flexible disk, a CD-ROM (Compact Disk Read Only Memory), or a memory card attached to the controller 20 and provided as a program product. Alternatively, the program can be provided by being recorded in a non-transitory computer-readable medium such as a hard disk built in a computer. Further, the program can be provided by downloading via a network. The program can be executed by one or more processors such as a CPU, or a combination of a processor and a circuit such as an ASIC or an FPGA.

Note that the program may invoke, in a prescribed sequence and at a prescribed timing, a necessary module from program modules provided as part of an operating system (OS) of the computer, and cause the processor to perform a process. In that case, the program itself does not include the above-described module, and the process is performed in cooperation with the OS. Such a program not including a module may also be included in the program according to the present embodiment.

Further, the program according to the present embodiment may be provided by being incorporated into a part of another program. Also in that case, the program itself does not include a module included in the other program, and causes the processor to perform a process in cooperation with the other program. Such a program incorporated in the other program may also be included in the program according to the present embodiment.

According to each of the above-described embodiments, it is possible to appropriately correct the image forming condition in consideration of the relationship between the color of the image to be formed on the recording medium and the color of the foundation under the color of the image.

ASPECTS

Hereinafter, aspects of the present disclosure will be listed.

(Item 1) An image forming apparatus (100) according to item 1 comprising: an image forming section that forms a first image (71) on a recording medium (S) based on an image forming condition; a detector (19) that detects a first color (M in single-color correction and R in secondary color correction) of the first image and a color of a foundation under the first image from the recording medium on which the first image is formed; a storage section (27) that stores reference data (distance, reference hue angle ratio) for specifying a relative relationship between a position of the first color in a color space and a position of the color of the foundation in the color space; and a controller (20), wherein the controller corrects the image forming condition based on the reference data and the first color and the color of the foundation detected by the detector (steps S110 to S114, steps S210 to S214).

(Item 2) The image forming apparatus according to item 1, wherein the image forming section produces the first color by transferring, onto the recording medium, a toner image formed by using a toner of any one color of a plurality of basic colors (60M).

(Item 3) The image forming apparatus according to item 1 or 2, wherein the reference data includes a distance between the position of the color of the foundation in the color space and the position of the first color in the color space (step S106).

(Item 4) The image forming apparatus according to item 3, wherein the image forming section forms, on the recording medium, a plurality of patch images (FIG. 8) to be used for correction of the image forming condition, the plurality of patch images includes a first patch image (60M) in which the first image of the first color is superimposed on a part of an image of the color of the foundation, the detector detects the first color and the color of the foundation from the plurality of patch images, and the controller corrects the image forming condition based on the reference data and the distance calculated based on a detection value of the detector (FIG. 10).

(Item 5) The image forming apparatus according to item 1 or 2, wherein the image forming section produces the first color by transferring, onto the recording medium, a toner image formed by superimposing a toner of a first basic color and a toner of a second basic color (60M1, 60M2).

(Item 6) The image forming apparatus according to item 5, wherein when the position of the color of the foundation in the color space is defined as a first position (O in FIG. 7), a position of the first basic color in the color space is defined as a second position (Y in FIG. 7), and a position of the second basic color in the color space is defined as a third position (M in FIG. 7), the reference data is calculated based on a first hue angle (MOY in FIG. 7) formed by the first position, the second position, and the third position with the first position as a vertex.

(Item 7) The image forming apparatus according to item 6, wherein when the position of the first color in the color space is defined as a fourth position (R in FIG. 7), the reference data is calculated based on the first hue angle (MOY in FIG. 7) and a second hue angle (ROY in FIG. 7) formed by the first position, the second position, and the fourth position with the first position as a vertex.

(Item 8) The image forming apparatus according to item 7, wherein the reference data is a ratio (reference hue angle ratio) of the first hue angle and the second hue angle, the image forming section forms, on the recording medium, a plurality of patch images (FIG. 9) to be used for correction of the image forming condition, the plurality of patch images include a first patch image (60R1, 60R2) in which the first image of the first color is superimposed on a part of an image of the color of the foundation, a first basic color patch image (60Y1, 60Y2) in which an image of the first basic color is superimposed on a part of the image of the color of the foundation, and a second basic color patch image (60M1, 60M2) in which an image of the second basic color is superimposed on a part of the image of the color of the foundation, the detector detects the color of the foundation, the first color, the first basic color, and the second basic color from the plurality of patch images (step S202), and the controller corrects the image forming condition based on the reference image and the ratio of the first hue angle and the second hue angle calculated based on a detection value of the detector (steps S210 to S214).

(Item 9) The image forming apparatus according to any one of items 5 to 8, wherein the controller corrects the image forming condition for one of the first basic color and the second basic color, the one being positioned as a lower layer on the recording medium (step S214).

(Item 10) The image forming apparatus according to any one of items 1 to 9, wherein the color of the foundation is a color of the recording medium or a second color of a second image of the color of the foundation, the second image being formed on the recording medium as the foundation under the first image (FIG. 4).

(Item 11) The image forming apparatus according to any one of items 1 to 10, wherein the controller changes the image forming condition while the first image is repeatedly formed on the recording medium by the image forming section (steps S110 to S115, steps S210 to S215).

(Item 12) The image forming apparatus according to any one of items 1 to 11, wherein the image forming section is capable of performing a process (step S101) of producing the first color that is a single color by transferring, onto the recording medium, a toner image formed by using a toner of any one color of a plurality of basic colors, and a process (step S201) of producing the first color that is a secondary color by transferring, onto the recording medium, a toner image formed by superimposing a toner of a first basic color and a toner of a second basic color, and the controller is capable of alternately performing a single-color correction process of correcting the image forming condition for the first color that is the single color, and a secondary color correction process of correcting the image forming condition for the first color that is the secondary color (FIG. 13).

(Item 13) The image forming apparatus according to any one of items 1 to 12, wherein the image forming condition include an imaging parameter (development bias or the number of rotations of a developing sleeve) that determines a development density.

(Item 14) The image forming apparatus according to item 13, wherein the imaging parameter includes a development bias or the number of rotations of a developing sleeve.

(Item 15) The image forming apparatus according to any one of items 1 to 14, wherein the image forming condition includes an image transfer parameter (a transfer pressure, a transfer current, a contact area at the time of transfer, and the like in development parameters).

(Item 16) The image forming apparatus according to any one of items 1 to 15, wherein the image forming condition includes a primary transfer bias.

(Item 17) A method of controlling an image forming apparatus, the method comprising: a step (step S101, step S201) of forming a first image on a recording medium based on an image forming condition; and a step (step S102, step S202) of detecting a first color of the first image and a color of a foundation under the first image from the recording medium on which the first image is formed, wherein the image forming apparatus includes a storage section (27) that stores reference data for specifying a relative relationship between a position of the first color in a color space and a position of the color of the foundation in the color space, the method further comprising a step (steps S110 to S114, steps S210 to S214) of correcting the image forming condition based on the reference data and the first color and the color of the foundation detected in the step of detecting.

(Item 18) A program for causing a computer to perform the control method according to item 17.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming apparatus comprising:
an image forming mechanism that forms a first image on a recording medium based on an image forming condition;
a detector that detects a first color of the first image and a color of a foundation under the first image from the recording medium on which the first image is formed;
a storage that stores reference data for specifying a relative relationship between a position of the first color in a color space and a position of the color of the foundation in the color space; and
a processing circuitry, wherein
the processing circuitry corrects the image forming condition based on the reference data and the first color and the color of the foundation detected by the detector.

2. The image forming apparatus according to claim 1, wherein the image forming mechanism produces the first color by transferring, onto the recording medium, a toner image formed using a toner of any one color of a plurality of basic colors.

3. The image forming apparatus according to claim 2, wherein the reference data includes a distance between the position of the color of the foundation in the color space and the position of the first color in the color space.

4. The image forming apparatus according to claim 3, wherein
the image forming mechanism forms, on the recording medium, a plurality of patch images to be used for correction of the image forming condition,
the plurality of patch images include a first patch image in which the first image of the first color is superimposed on a part of an image of the color of the foundation,
the detector detects the first color and the color of the foundation from the plurality of patch images, and
the processing circuitry corrects the image forming condition based on the reference data and the distance calculated based on a detection value of the detector.

5. The image forming apparatus according to claim 1, wherein the image forming mechanism produces the first color by transferring, onto the recording medium, a toner image formed by superimposing a toner of a first basic color and a toner of a second basic color.

6. The image forming apparatus according to claim 5, wherein when the position of the color of the foundation in the color space is defined as a first position, a position of the first basic color in the color space is defined as a second position, and a position of the second basic color in the color space is defined as a third position, the reference data is calculated based on a first hue angle formed by the first position, the second position, and the third position with the first position as a vertex.

7. The image forming apparatus according to claim 6, wherein when the position of the first color in the color space is defined as a fourth position, the reference data is calculated based on the first hue angle and a second hue angle formed by the first position, the second position, and the fourth position with the first position as a vertex.

8. The image forming apparatus according to claim 7, wherein
the reference data is a ratio of the first hue angle and the second hue angle, the image forming mechanism forms, on the recording medium, a plurality of patch images to be used for correction of the image forming condition, the plurality of patch images include
- a first patch image in which the first image of the first color is superimposed on a part of an image of the color of the foundation,
- a first basic color patch image in which an image of the first basic color is superimposed on a part of the image of the color of the foundation, and
- a second basic color patch image in which an image of the second basic color is superimposed on a part of the image of the color of the foundation, the detector detects the color of the foundation, the first color, the first basic color, and the second basic color from the plurality of patch images, and the processing circuitry corrects the image forming condition based on the reference data and the ratio of the first hue angle and the second hue angle calculated based on a detection value of the detector.

9. The image forming apparatus according to claim 5, wherein the processing circuitry corrects the image forming condition for one of the first basic color and the second basic color, the one being positioned as a lower layer on the recording medium.

10. The image forming apparatus according to claim 1, wherein the color of the foundation is a color of the recording medium or a second color of a second image of the color of the foundation, the second image being formed on the recording medium as the foundation under the first image.

11. The image forming apparatus according to claim 1, wherein the processing circuitry changes the image forming condition while the first image is repeatedly formed on the recording medium by the image forming mechanism.

12. The image forming apparatus according to claim 1, wherein
the image forming mechanism is capable of performing
- a process of producing the first color that is a single color by transferring, onto the recording medium, a toner image formed by using a toner of any one color of a plurality of basic colors, and
- a process of producing the first color that is a secondary color by transferring, onto the recording medium, a toner image formed by superimposing a toner of a first basic color and a toner of a second basic color, and the processing circuitry is capable of alternately performing a single-color correction process of correcting the image forming condition for the first color that is the single color, and a secondary color correction process of correcting the image forming condition for the first color that is the secondary color.

13. The image forming apparatus according to claim 1, wherein the image forming condition includes an imaging parameter that determines a development density.

14. The image forming apparatus according to claim 13, wherein the imaging parameter includes a development bias or the number of rotations of a developing sleeve.

15. The image forming apparatus according to claim 1, wherein the image forming condition includes an image transfer parameter.

16. The image forming apparatus according to claim 1, wherein the image forming condition includes a primary transfer bias.

17. A method of controlling an image forming apparatus including a storage that stores reference data for specifying a relative relationship between a position of a first color in a color space and a position of a color of a foundation in the color space, the method comprising:
- forming a first image on a recording medium based on an image forming condition;
- detecting the first color of the first image and the color of the foundation under the first image from the recording medium on which the first image is formed; and
- correcting the image forming condition based on the first color, the color of the foundation, and the reference data.

18. A non-transitory recording medium storing a computer readable program, the non-transitory recording medium comprising a program instruction for causing a computer to perform a method of controlling an image forming apparatus,
the image forming apparatus including a storage that stores reference data for specifying a relative relationship between a position of a first color in a color space and a position of a color of a foundation in the color space,
the method including
- forming a first image on a recording medium based on an image forming condition,
- detecting the first color of the first image and the color of the foundation under the first image from the recording medium on which the first image is formed, and
- correcting the image forming condition based on the first color, the color of the foundation, and the reference data.

* * * * *